United States Patent [19]
Jondrow

[11] Patent Number: 6,072,274
[45] Date of Patent: Jun. 6, 2000

[54] MOLDED PLASTIC PANEL FOR FLAT PANEL DISPLAYS

[75] Inventor: Timothy J Jondrow, Corvallis, Oreg.

[73] Assignee: Hewlett-Packard Company, Palo Alto, Calif.

[21] Appl. No.: 08/956,236

[22] Filed: Oct. 22, 1997

[51] Int. Cl.[7] .............................. H01J 17/49; H01J 29/18
[52] U.S. Cl. ........................ 313/495; 313/308; 313/497; 313/292; 313/461
[58] Field of Search ...................................... 313/422, 503, 313/504, 505, 506, 309, 308, 336, 351, 495, 497, 496, 306, 292, 461

[56] References Cited

U.S. PATENT DOCUMENTS

| | | |
|---|---|---|
| 5,396,351 | 3/1995 | Gessel . |
| 5,457,356 | 10/1995 | Parodos . |
| 5,503,582 | 4/1996 | Cathey, Jr. et al. . |
| 5,543,683 | 8/1996 | Haven et al. . |
| 5,543,691 | 8/1996 | Palevsky et al. . |
| 5,561,340 | 10/1996 | Jin et al. . |
| 5,578,899 | 11/1996 | Haven et al. . |
| 5,644,331 | 7/1997 | Hazama . |
| 5,650,690 | 7/1997 | Haven . |
| 5,656,887 | 8/1997 | Voshell et al. . |
| 5,821,002 | 10/1998 | Ohnishi et al. ...................... 313/504 X |
| 5,889,363 | 3/1999 | Beeteson et al. .................... 313/422 X |

*Primary Examiner*—Ashok Patel

[57] ABSTRACT

A molded plastic faceplate and/or a molded plastic backplate are used to form a flat panel display. A faceplate mold is formed by laser etching pixel recesses in the mold. The detail of such pixel recesses is copied onto a plastic faceplate by injection molding or compression molding a clear plastic. Such molding achieves pixel detail and depth detail to a microscopic precision. The borders of the pixel areas serve as spacers which separate the faceplate and backplate while containing liquid crystal or phosphor material. Electrical circuits are formed on the faceplate and/or backplate to define control circuitry for display pixels.

9 Claims, 4 Drawing Sheets

MOLDED PLASTIC PANEL FOR FLAT PANEL DISPLAYS

BACKGROUND OF THE INVENTION

This invention relates generally to flat panel display devices, and more particularly to panel structures for flat panel display devices.

A flat panel display device responds to a video signal to form an image on a screen. Such devices are used in conjunction with a host device which generates the image signal. Exemplary host devices are a computer, a calculator, a telephone, a hand-held device or other appliance. A large commercial use for the flat panel display is to serve as a computer display in place of a large and heavy cathode ray tube (CRT) display. A flat panel display, such as a liquid crystal display ('LCD') or a field emission display, is relatively light weight and consumes less power compared to the cathode ray tube. Such characteristics are particularly desirable for portable computing device displays, where light weight and low power are important attributes.

An LCD generally includes a backplate substrate, a faceplate substrate and a liquid crystal material sealed between the two. The liquid crystal is an oily substance that flows like a liquid, but has a crystalline order in the arrangement of its molecules. An electrical field is applied to thread-like or pneumatic liquid crystal molecules which respond by reorienting themselves along electric field lines. Such orientation of the molecules causes light to be transmitted or blocked. The backplate typically is a glass substrate on which are formed a horizontal scanning circuit, a vertical scanning circuit and a pixel region. For an active matrix LCD, the glass substrate is essentially a large integrated circuit having millions of thin-film transistor (TFT) switches. The TFT switches form horizontal and vertical scanning circuits. To fabricate the backplate, glass is poured defining an extremely flat substrate. The glass substrate is purified of alkali metals, which might contaminate the transistors or the liquid crystal. A thin film layer of semiconductive material then is deposited by a plasma process which condenses a random network of silicon, rich in hydrogen, onto the glass. Finally, metal electrodes, insulators and other elements are deposited in a manner similar to the fabrication of integrated circuits to define the TFT switches.

The faceplate typically includes electrodes to complete the TFT circuit paths. The faceplate also includes light polarizers and color filters. The LCD panel further includes a light source for providing backlighting. The liquid crystal material, along with a spacing medium, are sealed between the faceplate and the backplate by a glue around the periphery of the plates. The spacing medium typically is formed of very small spheres or fibers that, prior to gluing the plates together, are adhered to the underside of the faceplate by static electricity. The distance between the plates is determined by the diameter of the spheres. The TFT switches define respective cells of a pixel region. Each cell serves as a color pixel. Alternative LCD displays are formed by passive matrix designs formed with 'super twist' or 'double super twist' switches. A major distinction between active matrix LCDs and passive matrix LCDs are that passive matrix LCDs do not have a transistor associated with, and located with, each pixel.

A field emission display ('FED') includes a faceplate and a backplate spaced apart and sealed to define an intermediary vacuum envelope. The interior surface of the faceplate typically is coated with light emissive elements, such as phosphor or phosphor patterns, which define an active region of the display. Field emitters, or cathodes, are formed on the backplate. A gate electrode located on the backplate is associated with the emitters. When a sufficient voltage differential is established between the emitters and the gate electrode, a Fowler-Nordheim electron emission is initiated from the emitters. The released electrons are accelerated toward the phosphor regions, or anodes, on the faceplate. The electrons strike the phosphor causing the phosphor to emit photons. Emitted photons are intended to strike only certain targeted phosphors. Generally there is a one to one correspondence between each emitter (cathode) and phosphor (anode). A pixel is formed by one or more of such emitter and phosphor sets.

Conventionally an interelectrode spacer is used to separate the baseplate and faceplate. Such spacer also serves as an insulator preserving the voltage difference between the emitter and phosphor. U.S. Pat. No. 5,503,582 discloses a substrate between the faceplate and backplate having openings. The substrate serves as a spacer and insulator structure. U.S. Pat. No. 5,656,887 discloses a microchannel plate located between an emitter plate and a screen assembly. The microchannel plate includes a dielectric plate in which a large number of cylindrical passageways, or microchannels, are formed.

As described above, the conventional backplate and faceplate of an LCD panel or an FED panel is made from glass. One shortcoming of glass panels is that the glass is breakable. Another shortcoming is that the glass is relatively heavy. These shortcomings are more pronounced as flat panels are developed with larger viewing areas and lighter weight. To reduce weight the panels are made thinner. As the area of a glass panel increases and as the thickness of such panel decreases, the glass panel becomes undesirably more fragile. Another shortcoming of glass is that the manufacturing processes tend to result in glass panels of varying, rather than uniform, thickness. This is undesirable because varying thickness along the viewing area introduces varied refraction of display light. Accordingly, it is desirable to achieve a lighter flat panel display which is less fragile and more precisely manufactured to desired tolerances.

SUMMARY OF THE INVENTION

According to the invention, a molded plastic faceplate and/or a molded plastic backplate are used to form a flat panel display, rather than the conventional glass faceplate and backplate.

According to one aspect of the invention, a faceplate mold is formed by laser etching pixel recesses in the mold. The detail of such pixel recesses is copied onto a plastic faceplate by injection molding or compression molding a clear plastic. Such molding achieves pixel detail and depth detail to a microscopic precision. The borders of the pixel areas serve as spacers which separate the faceplate and backplate while containing liquid crystal or phosphor material. For an LCD panel the accurate spacing of the plates eliminates variation of liquid crystal thickness and thus improves color uniformity and light transmission.

According to another aspect of the invention, the faceplate is molded to define a pattern on the viewing surface which provides a desired light refractive pattern. Such pattern is prescribed to achieve any one or more of the following benefits: (i) better light dispersion which increases the viewing angle of the display compared to prior flat panel displays; (ii) greater focus for increased brilliance; (iii) prismatic blending of the three colors from sub-pixels to provide better color appearance, and (iv) prismatic detail to columnate backlighting.

According to another aspect of the invention, a polarizer film is compression molded to the backplate to achieve desired polarizing of backlight.

According to another aspect of the invention, thin film structures and related conductors, insulators and electrodes are vapor deposited onto the backplate to form horizontal and vertical control circuits for an LCD panel display.

According to another aspect of the invention, color filters are formed by vapor depositing metal films of different colors onto the faceplate.

According to another aspect of the invention, for a field emission device a pixel recess is loaded with color phosphors, then covered with a vapor deposited metal to form a gate for a field emission device pixel circuit.

According to another aspect of the invention spacers are integrated into the faceplate and serve to separate the backplate from a pixel area by a prescribed distance. In a preferred embodiment such spacers are uniformly distributed within the active region of the display.

One advantage of a plastic faceplate is that the flat panel display has a substantially higher flex modulus than a glass faceplate, making the display of this invention more rugged and impact resistant than a conventional flat panel display. Another advantage is that a plastic faceplate is able to achieve larger screens areas at thinner thickness than a glass faceplate while complying with nonfragility needs. An advantage of the uniformly distributed spacers formed in the plastic faceplate is that pressing on the panel allows less flow of liquid crystal than for the conventional panels. As a result color distortion of an image due to such pressing is less problematic. These and other aspects and advantages of the invention will be better understood by reference to the following detailed description taken in conjunction with the accompanying drawings.

DESCRIPTION OF SPECIFIC EMBODIMENTS

Overview

Figure 1:
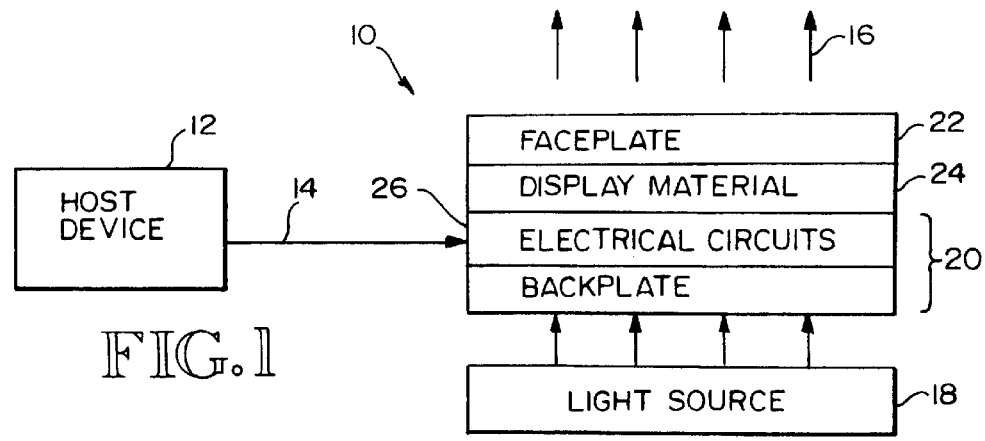
FIG. 1 is a block diagram of a flat panel display according to an embodiment of this invention.

FIG. 1 is a block diagram of a flat panel display 10 receiving control signals 14 from a host device 12. The display responds to the control signals 14 to generate an image perceived as emitted light 16. In some embodiments the display 10 includes a backlighting source 18. In other embodiments there is no backlighting, or alternatively backlighting is provided by reflecting light received from the ambient environment. The flat panel display 10 is basically a flat panel formed by a backplate 20 secured to a faceplate 22. A display material 24 is sandwiched between the backplate 20 and faceplate 22. The display material 24 is a passive or active matrix liquid crystal display (LCD) display material, or a field emission display material. An exemplary LCD material is MCLC 133 or 2,3-dicyano phenyl from Merck Corporation (New Jersey). An exemplary field emission display material is phosphor of one or more colors. Electrical circuits 26 are formed on the backplate 20 and receive the control signals 14. The electrical circuits 26 are arranged in intersecting rows and columns in operative association with the display material 24. The display 10 contains many pixels for defining an image. Each pixel is formed by an electrical circuit interacting with a local portion of the display material. The flat panel display 10 embodies a liquid crystal display (LCD) panel or a field emission display (FED) panel, and can be monochromatic, multi-color or full color.

LCD Panel

Figure 2:
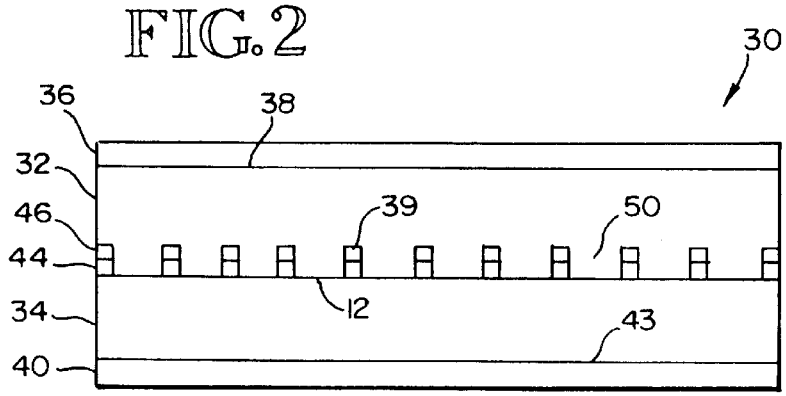
FIG. 2 is a cross-sectional view of an LCD panel according to an embodiment of this invention.

FIG. 2 shows a diagram of an LCD panel according to an embodiment of this invention. The LCD panel 30 is formed by a faceplate 32 secured to a backplate 34 by an epoxy or other leak proof sealant adhesive material. The faceplate 32 includes a first face 38 away from the backplate 34 and a second face 39 toward the backplate 34. The backplate 34 includes a first face 42 closest to the faceplate 32 and a second face 43 away from the faceplate 32. Either one or both of the faceplate and backplate are formed of a plastic material, (e.g., a high flow polycarbonate material such as used in the manufacture of compact disks). In some embodiments a polarizer 36 is deposited onto or adhered to a first face 38 of the faceplate 32. In addition a polarizer 40 is deposited onto or adhered to a first face 42 of the backplate 34. For a passive matrix LCD panel, column electrodes and row electrodes define electrical circuitry 44 vapor deposited onto the backplate 34. For an active matrix LCD panel thin film transistor (TFT) switches define the electronic circuitry 44. Such switches are formed by depositing a layer of silicon onto the backplate and depositing conductive materials to define the TFT switches and wiring lines for the TFT switches. Liquid crystal material 46 is inserted between the faceplate 32 and backplate 34.

Figure 3:
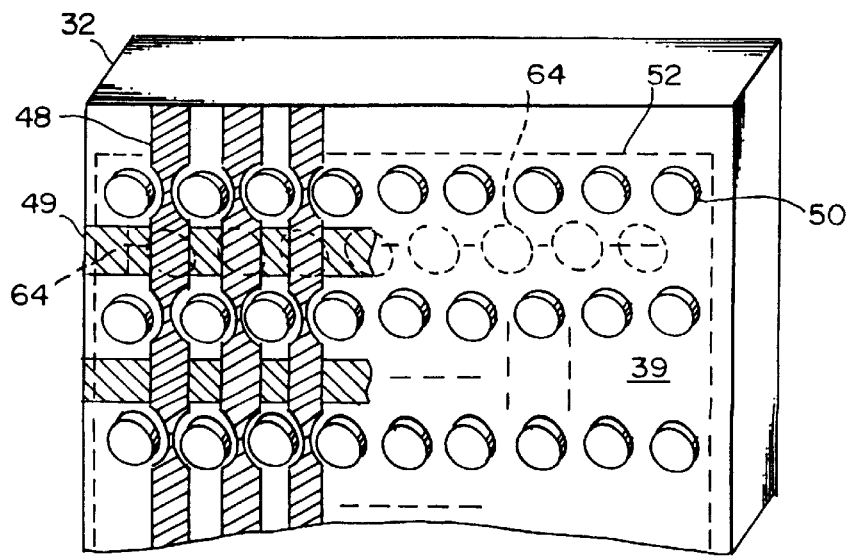
FIG. 3 is a perspective view of the faceplate for the panel of FIG. 2.

FIG. 3 shows a perspective view of the faceplate 32, along with several column electrodes 48 and a row electrode 49. Such electrodes 48, 49 are deposited onto the backplate 34 and are positioned as shown in FIG. 3, once the backplate 34 and faceplate 32 are secured together. Such electrodes 48, 49 occur within the entire pixel region, although positioning of only exemplary electrodes are shown. A sub-pixel area 64 occurs at the intersection of each column electrode 48 and row electrode 49. Typically each sub-pixel is oval or rectangular in shape. Three sub-pixels (e.g., a set of a red sub-pixel, green sub-pixel and blue sub-pixel) form a pixel generally define a square shape. According to a preferred embodiment the column electrodes 48 are formed by metal films having prescribed color using an alloying process or heat treatment process. The colored column conductors 48 serve as color filters which define the colors of the sub-pixels in a given column.

Figure 4:
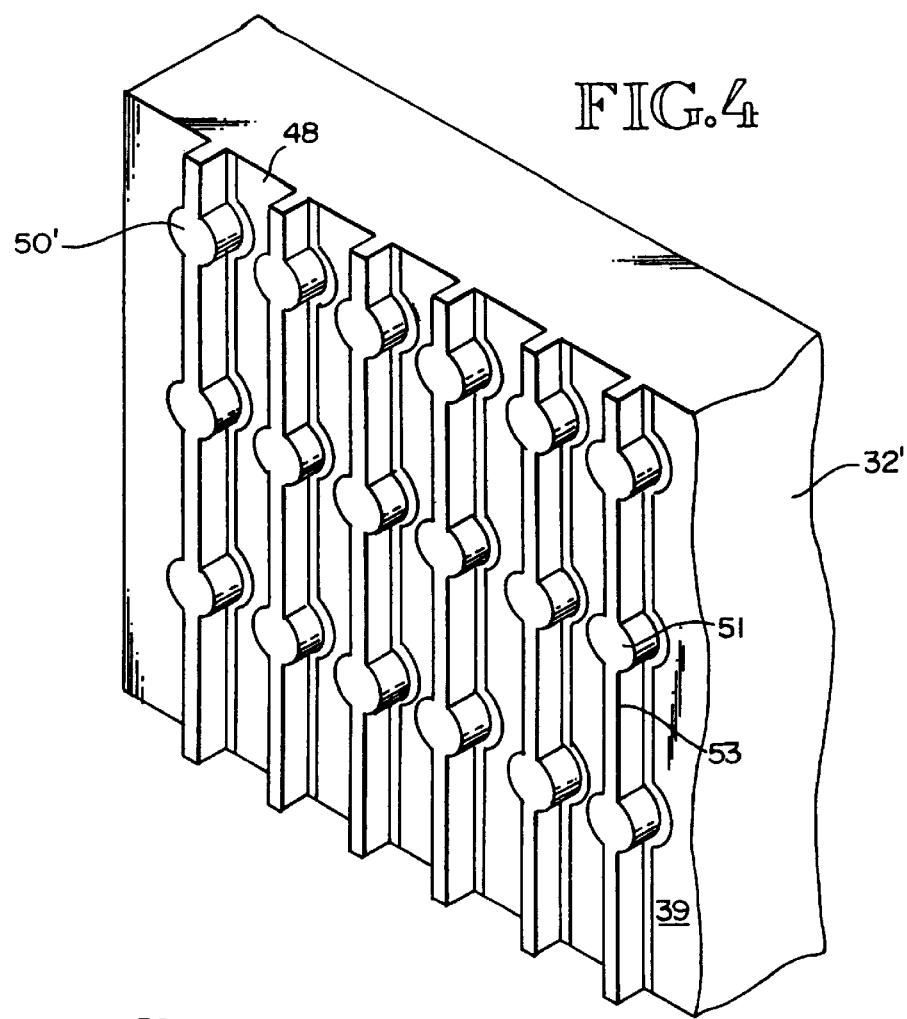
FIG. 4 is a perspective view of the faceplate for an alternative embodiment of the panel of FIG. 2.

According to an aspect of the invention, the faceplate 32 is molded to a prescribed shape. Such shape is that of a flat panel having a plurality of protruding spacer pillars 50. Each pillar 50 is formed integrally with the faceplate 32 and is of uniform size and shape. Preferably the pillars 50 are uniformly distributed over a pixel region 52 of the faceplate 32 at the same pitch as the pixels or sub-pixels, although greater pitches also may be used. The height of the pillars is determined by the LCD material used. The height is prescribed to be sufficient for accommodating wicking of the LCD material. In an exemplary embodiment the pillars 50 each have a common height of 0.05 mm and a diameter of 1.0 mm. Preferably the height to diameter ratio is 2:1 with a 5 degree draft, although other ratios and drafts may be used. FIG. 4 shows an alternative embodiment of the faceplate 32' in which rails 50' are formed which serve the same function as the pillars 50 of FIG. 3. The rails 50' having bulbous regions corresponding to the pillars 50 of faceplate 32. In addition the rails 50' have thinner regions connecting the bulbous regions in a given column.

Figure 5:
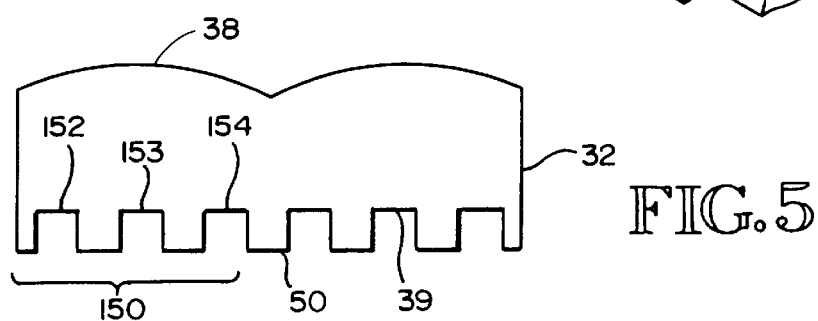
FIG. 5 is a perspective view of a portion of a faceplate showing a convex pattern over each pixel area.
Figure 6:
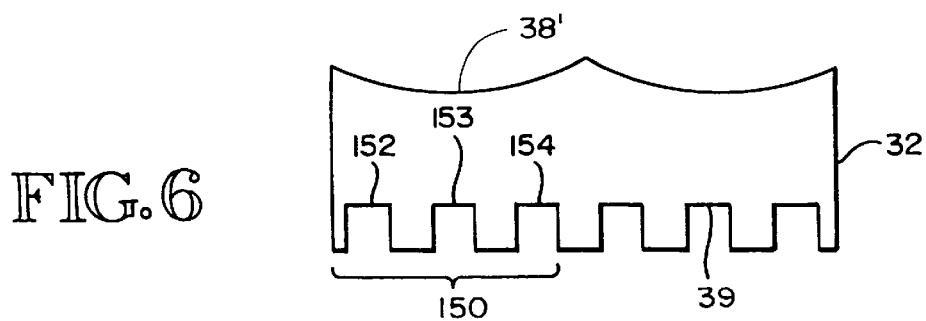
FIG. 6 is a perspective view of a portion of a faceplate showing a concave pattern over each pixel area.

To form the faceplate 32, first a mold is created. Extremely fine detail down to the micron level is achieved in the mold using a laser etching process similar to that used in compact disk fabrication. The faceplate 32 then is formed to the desired dimensions down to the same micron precision by a mold injection or compression process. According to various embodiments the viewing surface 38 of the faceplate is textured and/or contoured to achieve desired functions. In one embodiment the viewing surface is frosted or textured at a random grating to disperse the light and achieve a wider viewing angle and/or prismatic blending of sub-pixel colors. Alternative patterns are prescribed to provide focus of the emitted light or to columnate backlighting. FIG. 5 shows a pattern where the viewing surface has a spherically convex pattern over each pixel 150 (i.e., over each RGB sub-pixel 152, 153, 154 group). FIG. 6 shows a pattern where the viewing surface has a spherically concave pattern over each pixel (i.e., over each RGB sub-pixel group). Another alternative pattern is a fresnel lens type pattern. The fresnel lensing pattern is prescribed to columnate, diffuse or focus the light depending on the particular fresnel grid prescribed.

Figure 7:
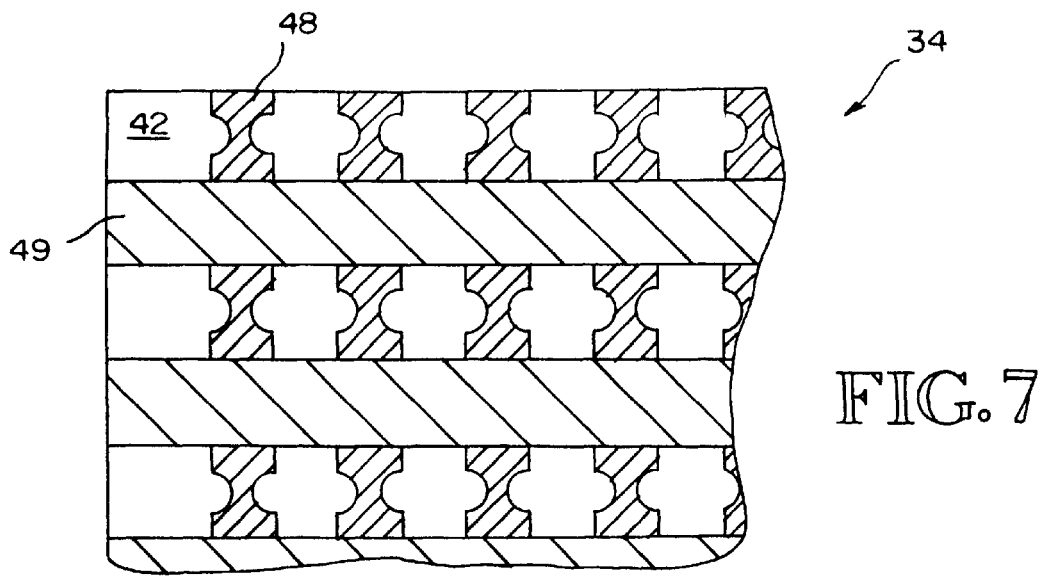
FIG. 7 shows a planar view of a surface of the backplate of FIG. 2 showing column electrodes and row electrodes.

The backplate 34 also is formed by injection molding or compression molding plastic to a prescribed shape having prescribed features. According to one embodiment the backplate 34 is formed by a flat piece of plastic. As shown in FIG. 7, column electrodes 48 and row electrodes 49 are vapor deposited onto the backplate 34 to define the circuitry 44. In some embodiments a polarizer layer 40 also is applied to the backplate 34.

Figure 8:
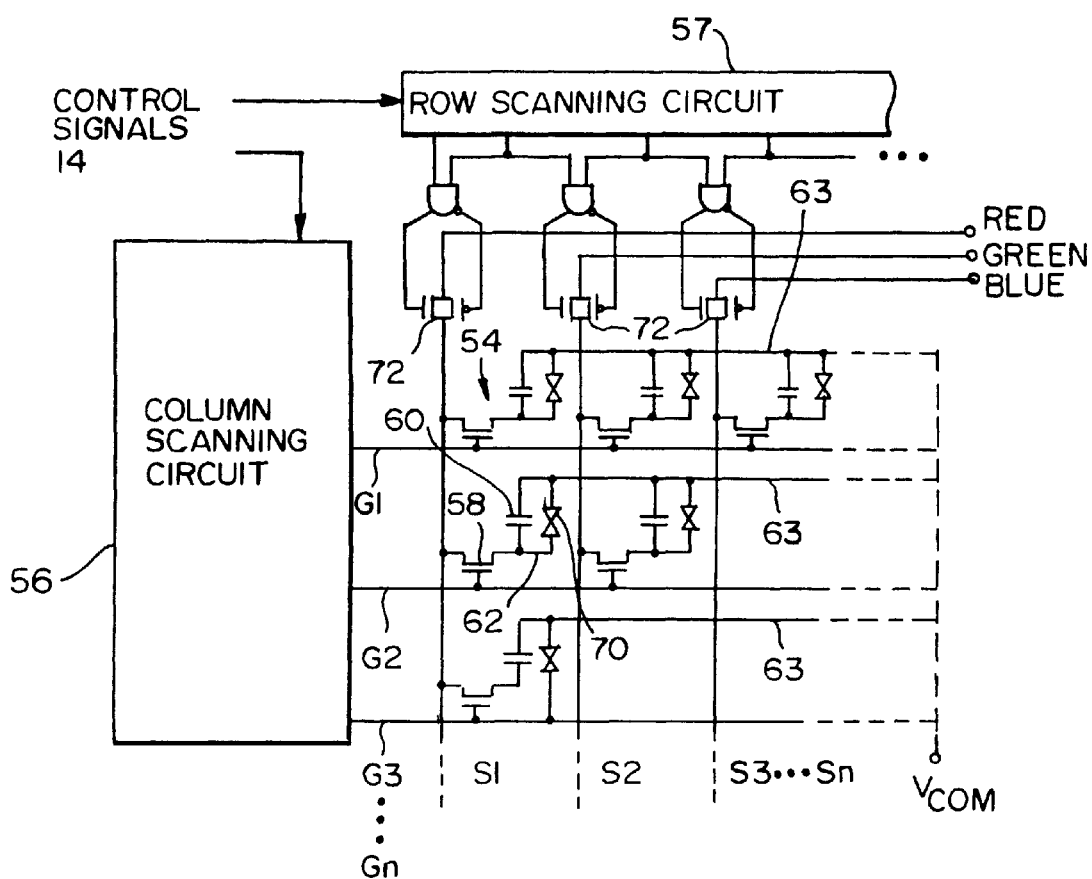
FIG. 8 is a schematic diagram of an active matrix LCD panel embodiment.

FIG. 8 shows a schematic diagram for the electronics circuits 44 of an active matrix LCD panel embodiment 30. A plurality of TFT switches 54 are coupled to a column scanning circuit 56 via gate lines G1, G2, . . . Gn, to a row scanning circuit 57 by signal lines S1, S2, . . . Sn, and to a common voltage Vcom via a common electrode 63. Each switch 54 is formed by a thin film transistor 58, a capacitance element 60 and a pixel electrode 62. Local liquid crystal material 70 is disposed between the pixel electrode 62 and the common electrode 63 in parallel to the capacitance element 60. The gate lines G1, G2, . . . Gn are connected to a row scanning circuit enabling the gate lines to be scanned. The signal lines, S1, S2, . . . , Sn are connected respectively through scanning switches 72 to respective video input lines for red, green and blue video signals. Thus each switch 54 and local liquid crystal material 70 defines a sub-pixel for a given color. The three sub-pixels for the three colors define a pixel area. Typically each sub-pixel is oval or rectangular in shape, while the three sub-pixels forming the pixel generally define a square shape. By driving the switch 54 and selectively applying voltage to the pixel electrode 62 through the TFT 58, an electrical field is created which changes the orientation of nearby liquid crystal material 70. Selective control of the switches thus leads to control of the liquid crystal 70 in each pixel area 64 so as to form a desired image.

In operation an unpolarized light source 18 emits light radiation from behind the backplate 34 to substantially irradiate the entire back plane. Alternatively or in addition, light from the viewer's environment received through the display screen is reflected back to illuminate the display. The irradiating and or illuminating light rays traverse through a first polarizer layer 40 which polarizes the light in a first arbitrary direction. The polarized light travels into and through the backplate 34 to the liquid crystal region 46 between the faceplate 32 and backplate 34. Scanning circuits receive control signals 14 which define the state of each pixel 64 in the pixel region 52. Such circuitry defines local electrical fields which cause the liquid crystal material for a given pixel to align along a desired direction allowing the backlight to pass or be blocked. For color displays, the backlight passes through color filters within the backplate on route to the pixel region.

FED Panel

Figure 9:
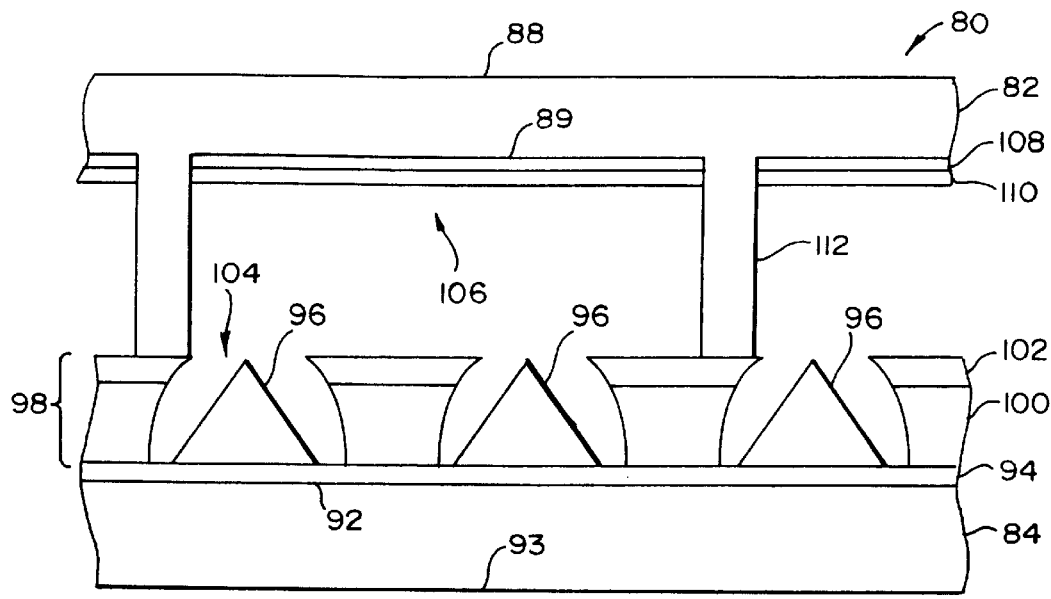
FIG. 9 is a cross-sectional view of the faceplate of an FED panel according to an embodiment of this invention.

FIG. 9 shows a field emission display (FED) panel 80 according to an embodiment of this invention. The FED panel 80 is formed by a faceplate 82 vacuum sealed (e.g., $10^{-6}$ Torr) to a backplate 84 by an epoxy or other leak proof sealant adhesive material. The faceplate 82 includes a first face 88 away from the backplate 84 and a second face 89 toward the backplate 84. The backplate 84 includes a first face 92 closest to the faceplate 82 and a second face 93 away from the faceplate 82. Either one or both of the faceplate and backplate are formed of a plastic material, (e.g., a high flow polycarbonate material such as used in the manufacture of compact disks). In some embodiments a polarizer (not shown) is deposited onto or adhered to a first face 88 of the faceplate 82. In addition a polarizer (not shown) may be deposited onto or adhered to a first face 92 of the backplate 84. The faceplate 82 and backplate 84 are formed by injection molding or compression molding plastic to a prescribed shape having prescribed features.

According to one embodiment the backplate 84 is formed by a flat piece of plastic. Deposited and patterned onto the backplate 84 is a layer 94 of doped silicon. An array of emitters 96 are formed on the layer 94, along with an emitter shutter 98. The layer 94 provides conductive paths which allow a voltage to be applied to select emitters 96. When a signal is applied to an emitter 96 electrons are emitted toward the faceplate 82. The electron shutter 98 is formed by an insulative layer 100 and a conductive layer 102 with openings 104 for the emitters 96. The conductive layer 102 serves as a gate electrode. When a signal is applied to a gate electrode 102 and an emitter 96, an electric field is created which causes the emitter initiate a Fowler-Nordheim emission of electrons through the shutter 98 toward the faceplate 82. The emitters, thus, serve as respective cathodes.

Figure 10:
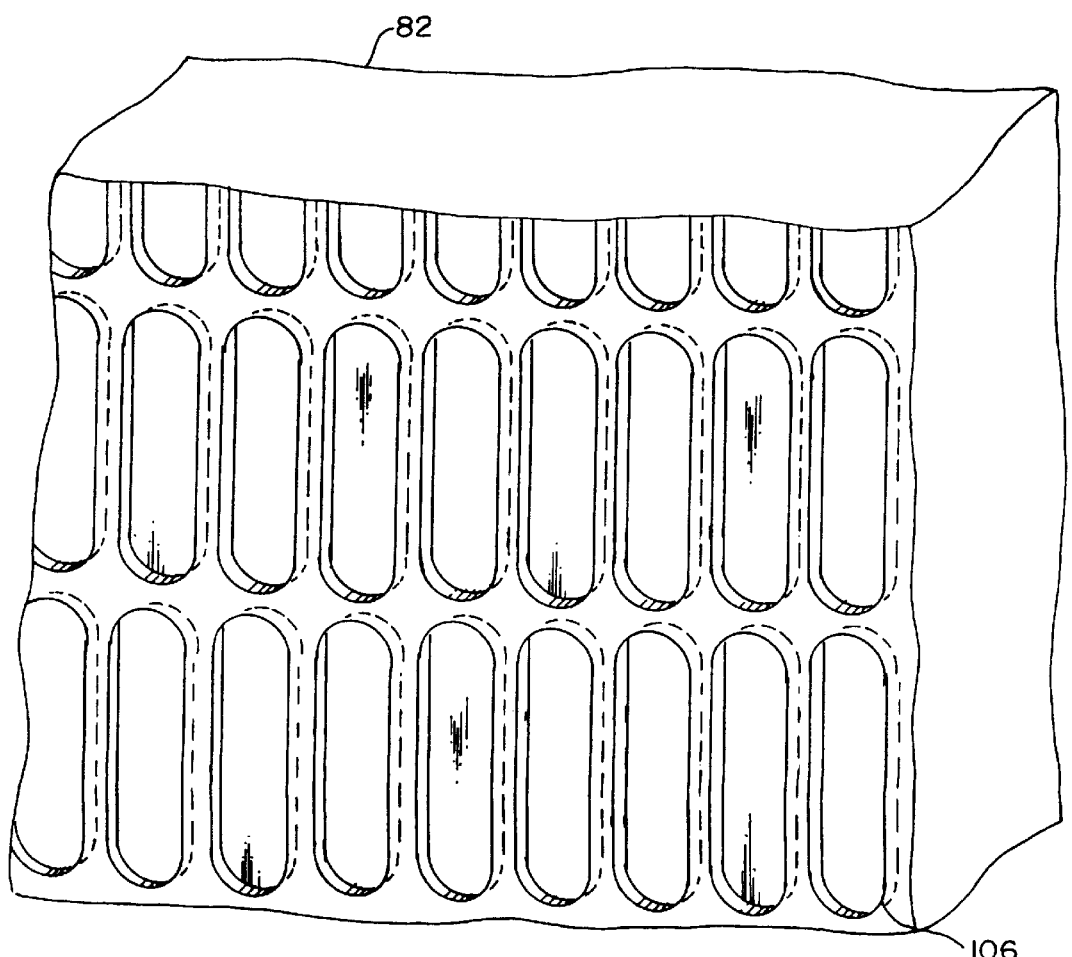
FIG. 10 is a perspective view of a faceplate of an FED panel according to an embodiment of this invention.

FIG. 10 shows an embodiment of the faceplate 82. The faceplate 82 includes a plurality of recesses 106 isolated from each other. Each one or more of the recesses corresponds to an image pixel or a colored sub-pixel. In one embodiment three adjacent recesses correspond to respective red, green and blue sub-pixels. The three sub-pixels together define a pixel. The depth of the recess depends on the thickness needed for the phosphor. In an exemplary embodiment each recess 106 has a common depth of approximately 0.05 to 0.10 mm. Preferably the width of the recess corresponds to the width of a sub-pixel and the height corresponds to the height of a sub-pixel (which is the same as the height of a pixel). In addition, the spacing between recesses along a horizontal axis is the pitch between sub-pixels and the spacing between recesses along a vertical axis is the pitch between pixels.

Deposited within each recess is a conductive layer 108 which serves as an anode for electrons emitted by the cathode emitters 96. Deposited onto the conductive layer 108 is a phosphor 110 or a prescribed color. According to a preferred embodiment each recess receives a phosphor of one color among a range of phosphor colors including red, green and blue. Preferably the phosphors are uniformly distributed so that three adjacent recesses include three different colored phosphors and serve as sub-pixels defining an image pixel. Each recess is bordered by a wall 112 which protrudes from the first face 89. Electrons emitted from the cathode emitters 96 strike the phosphor of a corresponding pixel recess 106 causes the phosphor to emit photons of light.

According to various embodiments the viewing surface 38 of the faceplate is textured and/or contoured to achieve desired functions. In one embodiment the viewing surface is frosted or textured at a random grating to disperse the light and achieve a wider viewing angle and/or prismatic blending of sub-pixel colors. Alternative patterns are prescribed to provide focus of the emitted light or to columnate backlighting. FIG. 5 shows a pattern where the viewing surface has a spherically convex pattern over each pixel (i.e., over each RGB sub-pixel group). FIG. 6 shows a pattern where the viewing surface has a spherically concave pattern over each pixel (i.e., over each RGB sub-pixel group). Another alternative pattern is a fresnel lens type pattern. The fresnel lensing pattern is prescribed to columnate, diffuse or focus the light depending on the particular fresnel grid used.

Meritorious and Advantageous Effects

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A flat panel display apparatus for displaying image pixels which together form an image, the apparatus comprising:

a plastic backplate having a first face upon which are deposited conductive electrodes;

a plastic faceplate having a first face, the faceplate first face secured to the backplate first face, the faceplate first face having a plurality of pixel areas covered with a display material responsive to a signal applied to the electrodes of the backplate, the plastic faceplate first face further having a plurality of integral protrusions of uniform height extending toward the backplate first face serving as spacers between the faceplate pixel areas and the backplate first face; and wherein the display material within a pixel area defines a state of a corresponding image pixel.

2. The display apparatus of claim 1, in which a plurality of transistor switches are deposited onto the backplate, and wherein the display material is liquid crystal.

3. The display apparatus of claim 1, wherein each one of the plurality of protrusions comprises a post.

4. The display apparatus of claim 1, wherein each one of the plurality of protrusions comprises a rail having a plurality of bulbous regions connected by thinner regions.

5. The display apparatus of claim 1, in which the plurality of protrusions are uniformly positioned along the faceplate first face within a pixel region of the faceplate.

6. The display apparatus of claim 1, in which light is emitted through the faceplate to define an image, and in which the faceplate has a second face opposite the first face, wherein the second face is patterned to define a light refractive pattern to disperse said light over a viewing angle.

7. The display apparatus of claim 1, in which light is emitted through the faceplate to define an image, and in which the faceplate has a second face opposite the first face, wherein the second face is patterned to define a light refractive pattern to focus the light.

8. The display apparatus of claim 1, in which light is emitted through the faceplate to define an image, and in which the faceplate has a second face opposite the first face, wherein the second face is patterned to define a light refractive pattern to prismaticly blend light of differing color to define image pixels.

9. A flat panel display apparatus for displaying image pixels which together form an image the apparatus comprising:

a plastic backplate having a first face upon which are deposited conductive electrodes;

a plastic faceplate having a first face, the faceplate first face secured to the backplate first face, the faceplate first face having a plurality of pixel areas covered with a display material responsive to a signal applied to the electrodes of the backplate, and wherein the display material within a pixel area defines a state of a corresponding image pixel, and wherein the electrodes on the backplate are gate electrodes, and in which each one of the plurality of pixel areas is a recess of a common depth within the faceplate first face, and further comprising an electroluminescent material and a conductor within each one of the plurality of pixel area recesses, the conductor within any given one of the plurality of pixel areas serving as an anode, and wherein the backplate includes a plurality of emitters deposited on the backplate first face which serve as respective cathodes, and wherein a given cathode responds to an electrical signal at a corresponding gate electrode by emitting an electron into a corresponding anode causing the electroluminescent material adjacent said anode to illuminate.

* * * * *